United States Patent
Yamashita

(10) Patent No.: US 6,493,794 B1
(45) Date of Patent: Dec. 10, 2002

(54) LARGE SCALE FIFO CIRCUIT

(75) Inventor: Haruki Yamashita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/313,406

(22) Filed: May 18, 1999

(30) Foreign Application Priority Data

May 18, 1998 (JP) .......................................... 10-135525

(51) Int. Cl.$^7$ .............................................. G06F 12/00
(52) U.S. Cl. .................... 711/109; 326/93; 365/189.12; 365/233
(58) Field of Search .............................. 710/71, 57, 68; 711/109, 105, 167; 712/236; 365/23.3, 189.08, 189.12; 326/113, 98, 93

(56) References Cited

U.S. PATENT DOCUMENTS

| | | | | |
|---|---|---|---|---|
| 4,250,406 A | * | 2/1981 | Alaspa | 326/121 |
| 4,733,405 A | * | 3/1988 | Shimizume et al. | 377/29 |
| 4,839,866 A | * | 6/1989 | Ward et al. | 365/189.01 |
| 4,876,704 A | * | 10/1989 | Ozaki | 377/70 |
| 4,943,947 A | * | 7/1990 | Kobayashi | 365/189.12 |
| 5,175,819 A | * | 12/1992 | Ngoc et al. | 710/71 |
| 5,367,551 A | * | 11/1994 | Okumura et al. | 377/106 |
| 5,473,756 A | * | 12/1995 | Traylor | 710/57 |
| 6,105,106 A | * | 8/2000 | Manning | 326/113 |
| 6,262,597 B1 | * | 7/2001 | Bauer et al. | 326/40 |
| 6,343,365 B1 | * | 1/2002 | Matsuzawa et al. | 365/201 |

FOREIGN PATENT DOCUMENTS

| | | | |
|---|---|---|---|
| JP | 3 62097030 A | * | 5/1987 |
| JP | 2-282999 | | 11/1990 |
| JP | 3-262329 | | 11/1991 |
| JP | 4-10811 | | 1/1992 |
| JP | 4-145721 | | 5/1992 |
| JP | 4-212521 | | 8/1992 |
| JP | 4-299614 | | 10/1992 |
| JP | 5-282249 | | 10/1993 |
| JP | 11-328947 | * | 11/1999 |

OTHER PUBLICATIONS

Kluge, W., "Data File Management in Shift–Register Memories", ACM Transactions on DataBase Systems, vol. 3, pp. 159–177, Jun. 1978.*

32×32 Shared Buffer Type ATM Switch VLSI's foe B–IS-DN's, IEEE Journal on Selected Areas in Communications, vol. 9, pp. 1239–1247, Oct. 1991.*

* cited by examiner

Primary Examiner—Matthew Kim
Assistant Examiner—Pierre-Michel Bataille
(74) Attorney, Agent, or Firm—Dickstein, Shapiro, Morin & Oshinsky, LLP.

(57) ABSTRACT

In a large scale FIFO circuit comprising a shift register circuit, the shift register circuit is reduced in its occupation area size to reduce the entire size of the FIFO circuit. A necessary number N of addresses is divided by positive integers A, B, . . . , M (where A×B×. . . , ×M≧N) to form a plurality of small scale shift register circuits in each of an A address generation circuit (1), B address generation circuit (2), . . . , and, an M address generation circuit (3). An external input CLK (i.e., clock) signal is supplied to only one of the small scale shift register circuits, i.e., only the A address generation circuit. Of the remaining small scale shift register circuits, one has its address output signal supplied to its successors as a clock input signal by cascading the remaining small scale register circuits in connection, so that a plurality of the A addresses, B addresses, . . . , and, the M addresses are generated, which are combined with each other, whereby addressing or address setting is performed.

16 Claims, 4 Drawing Sheets

| RCLK | ⎍⎍⎍⎍⎍⎍⎍⎍⎍ ...... ⎍⎍⎍⎍⎍ | | | | | | | | | | | | |
|---|---|---|---|---|---|---|---|---|---|---|---|---|---|
| read address | 0 | 1 | 2 | 3 | 4 | 5 | 6 | 7 | ... | 12 | 13 | 14 | 15 | 0 |
| A address | 0 | 1 | 2 | 3 | 0 | 1 | 2 | 3 | ... | 0 | 1 | 2 | 3 | 0 |
| B address | 0 | | | | 1 | | | | 2 | | | | 3 | 0 |

LARGE SCALE FIFO CIRCUIT

BACKGROUND OF THE INVENTION

1. Field of the Invention

The present invention relates to a large scale FIFO (i.e., large scale integration First In First Out) circuit in which a shift register circuit constructed of a plurality of flip-flop circuits performs address generation. More particularly, the present invention relates to a large scale FIFO circuit which is capable of reducing its entire size by reducing the occupation area size of the shift register circuit.

Further, the present invention relates to a large scale FIFO circuit capable of temporary storing data in a memory when the data is low in processing speed. The large scale FIFO circuit is also capable of outputting the thus processed data from the memory at high speed in order of completion of such processing of the data.

2. Description of the Related Art

As shown in FIG. 5, the large scale FIFO circuit of this type is used extensively in each of: a shift resister circuit 51-W which assigns memory locations of a memory 50 to input data Din being stored therein; and, a shift resister circuit 51-R which identifies the memory locations of the memory 50 from which output data Dout is sequentially retrieved.

Heretofore, as shown in FIG. 6, in this type of the large scale FIFO circuit, for example, with respect to addresses of 16 words, 16 pieces of the flip flop (hereinafter referred to as the F/F) circuits 100 to 115 are used to form a shift register circuit. These F/F circuits 100 to 115 are connected in series with each other, wherein an output signal of the last F/F circuit 115 is inputted to the first F/F circuit 100 to provide a loop arrangement in the F/F circuits 100 to 115. Further, the same clock (hereinafter referred to as the CLK) signal is applied to the CLK terminals of these F/F circuits 100 to 115. Each of addresses 0 to 15 corresponds to an output signal of each of the corresponding F/F circuits 100 to 115, and, therefore supplies such output signal therefrom.

Consequently, in a condition in which shift data stays in the address 0 at a time of occurrence of a first CLK signal, when a second CLK signal is inputted to tall the CLK terminals of the F/F circuits 100 to 115, the shift data is shifted to the address 1. When a third CLK signal is inputted to all the CLK terminals of the F/F circuits 100 to 115, the shift data further is shifted to the address 2. In this way, the shift data is successively shifted from one address to another address which is successive to such one address when the successive CLK signal is inputted to the CLK terminals of the F/F circuits 100 to 115.

In the conventional large scale FIFO circuit just described above, the number of stages of the F/F circuits which form the shift register circuit is large, so that the shift register circuit is large in occupation area size, which increases the entire size of the FIFO circuit, and, therefore presents a problem.

The reason why the entire size of the FIFO circuit increases is that the number of stages of the F/F circuits forming the shift register circuit is directly depending on the number of words, i.e., size of a memory to which the F/F circuits are directed. For example, in the case of small 32 words, a necessary number of stages of the F/F circuits is only 32. However, in the case of, for example, large 1000 words, a necessary number of stages of the F/F circuits becomes a very large number such as 1024. Due to this, the entire size of the FIFO circuit increases.

SUMMARY OF THE INVENTION

It is accordingly an object of the present invention to solve the above problem by providing a large scale FIFO circuit, the entire size of which FIFO circuit is reduced by reducing a shift register circuit in its occupation area size.

According to a first aspect of the present invention, there is provided a large scale FIFO circuit in which address generation is performed by a shift register circuit constructed of a plurality of flip flop circuits, the improvement wherein:

the shift register circuit is divided into a plurality of small scale shift register circuits each constructed of a plurality of the flip flop circuits; and the address is defined by combination of outputs of the flip flop circuits which form each of the small scale shift register circuits.

According to a second aspect of the present invention, there is provided a large scale FIFO circuit in which address generation is performed by the shift register circuit constructed of a plurality of the flip flop circuits:

a plurality of small scale shift register circuits each constructed of a plurality of the flip flop circuits are formed;

an input clock signal is supplied to a first one of the small scale shift register circuits;

of the remaining ones of the small scale shift register circuits, one has its address output signal supplied to its successors as a clock input signal by cascading the remaining small scale register circuits in connection;

the number of addresses in the address generation is divided by a positive integer, which integer forms a first factor of the number of the addresses, to produce a plurality of second factors of the number of the addresses;

the number of the flip flop circuits in each of the small scale shift register circuits is equal to the number of each of the second factors of the number of the addresses;

an input clock signal is supplied to a first one of the small scale shift register circuits; and of the remaining ones of the small scale shift register circuits, one has its address output signal supplied to its successor as a clock input signal by cascading the remaining small scale register circuits in connection.

Due to the above construction, it is possible that the large scale FIFO circuit is constructed of a plurality of thus divided small scale shift register circuits. This reduces the number of the flip flop circuits forming the shift register circuit. Since the shift register circuit is reduced in size, it is possible to reduce the entire size of the FIFO circuit.

A preferable mode for practicing the present invention has the following construction: namely In a large scale FIFO circuit in which: address generation is performed by a shift register circuit constructed of a plurality of flip flop circuits; and, addresses in the address generation identify memory locations of a memory in each of a read and a write side of the memory, the memory having an address space for a plurality of words the number of which is N, the improvement wherein:

the N is divided into its factors A and B (i.e., N=A ×B; where each of N, A and B is a positive integer);

with respect to each of the factors A and B, each of a plurality of small scale register circuits is formed;

an input clock signal is supplied to one of the small scale shift register circuits, which one corresponds to the factor A to supply an output signal to the other of the small scale shift register circuits as a clock signal therefor, the other corresponding to the factor B.

In this case, in each of the read and the write side, it is possible for the shift register circuit to reduce the number of N pieces of the conventional flip flop circuits up to (A+B) pieces.

Further, when each of the small scale shift register circuits is of the same circuit scale, it is possible for the large scale FIFO circuit to be a minimum size in construction.

The reason why it is possible to reduce the shift register circuits in their occupation area size and to reduce the entire size of the FIFO circuit is that: addressing or address setting is performed by combination of a plurality of addresses, which addresses are generated by sequentially cascading the small scale shift register circuits, wherein: the number of necessary addresses is divided to form a plurality of small scale shift register circuits; an external input clock signal is supplied to only one of the small scale shift register circuits; and, of the remaining ones of the small scale shift register circuits, one has its output signal supplied to its successor as a clock input signal by cascading these small scale shift register circuits.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best mode for carring out the present invention will be described in detail using an embodiment with reference to the accompanying drawings.

Figure 1:
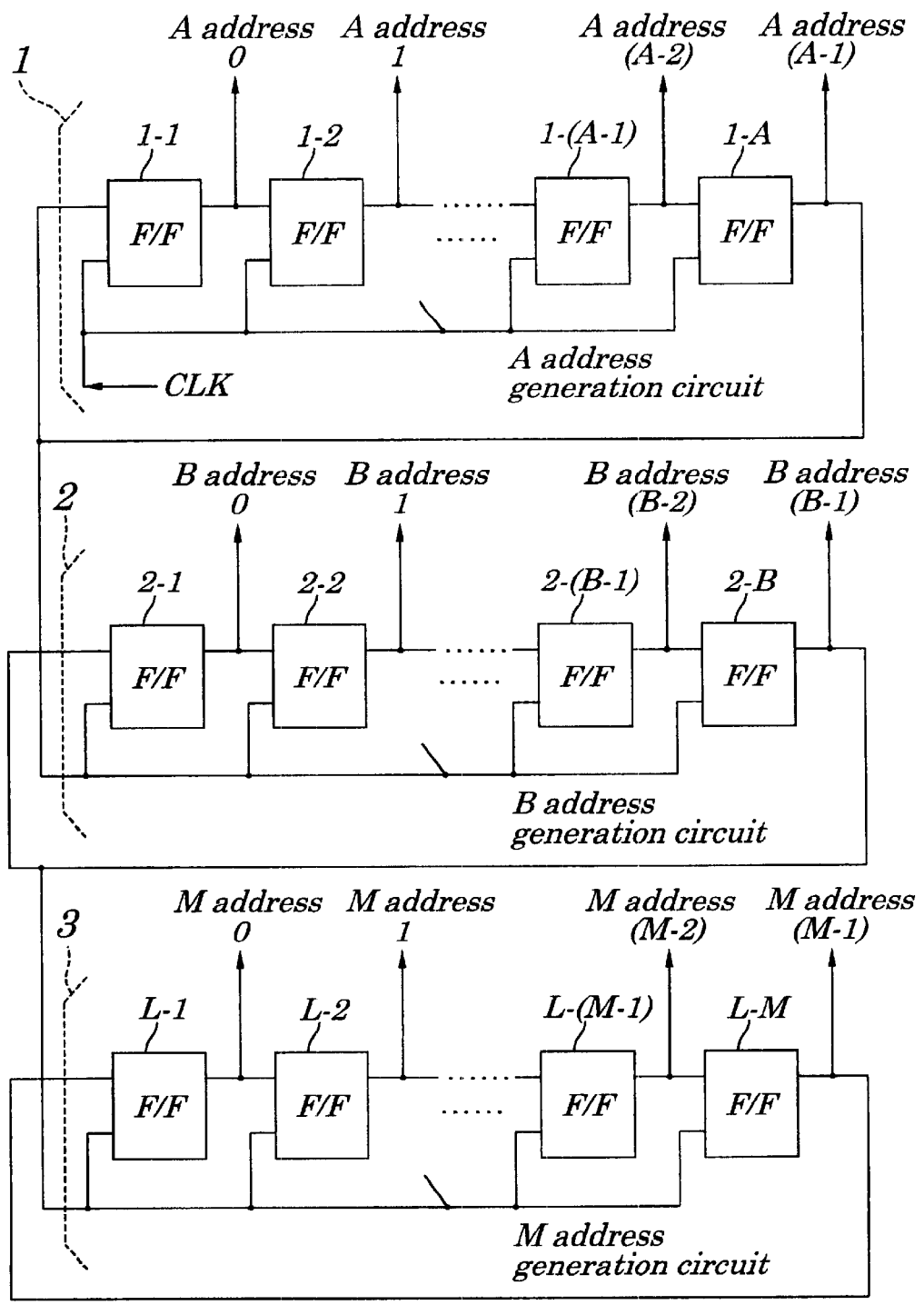
FIG. 1 is a functional block diagram of an embodiment of the shift register circuit of the present invention.

FIG. 1 shows a functional block diagram of an embodiment of a large scale FIFO (i.e., First In First Out) circuit of the present invention.

In the large scale FIFO circuit shown in FIG. 1, with respect to addresses for a plurality of words the number of which is a positive integer N, a plurality of small scale shift register circuits (A, B, . . . , and M) the number of which is a positive integer L are formed. These small scale shift register circuits (A, B, . . . , and M) correspond to an A address generation circuit 1, B address generation circuit 2,. . . and an M address generation circuit 3, respectively, and are cascaded in construction. The A address generation circuit 1 is provided with A pieces of first F/F circuits 1-1 to 1-A. The B address generation circuit 2 is provided with B pieces of second F/F circuits 2-1 to 2-B. The M address generation circuit 3 is provided with M pieces of L-th F/F circuits L-1 to L-M. The relationship between these positive integers N, L, A, B and M is defined by the following equations in parenthesis:

(N≦A×B×. . .×M); and (L=A+B+. . .+M)

The first F/F circuits 1-1 to 1-A have their input and output terminals connected in series with each other, wherein a last one 1-A of the first F/F circuits 1-1 to 1-A has its output terminal connected with an input terminal of a first one 1-1 of the first F/F circuits 1-1 to 1-A to provide a loop arrangement in the A address generation circuit 1. An external input CLK (i.e., clock) signal is applied simultaneously to all the CLK terminals of the first F/F circuits 1-1 to 1-A. Output signals issued from the first F/F circuits 1-1 to 1-A are directed to the A addresses 0 to (A-1), respectively, and are then issued therefrom.

The second F/F circuits 2-1 to 2-B have their input and output terminals connected in series with each other, wherein a last one 2-B of the second F/F circuits 2-1 to 2-B has its output terminal connected with an input terminal of a first one 2-1 of the second F/F circuits 2-1 to 2-B to provide a loop arrangement in the B address generation circuit 2. An output signal of the last one 1-A of the first F/F circuit 1-1 to 1-A of the A address generation circuit 1 is applied as a clock signal to all the CLK terminals of the second F/F circuits 2-1 to 2-B of the B address generation circuit 2. Output signals issued from the second F/F circuits 2-1 to 2-B are directed to the B addresses 0 to (B-1), respectively, and are then issued therefrom.

In the same way, The L-th F/F circuits L-1 to L-M have their input and output terminals connected in series with each other, wherein a last one L-M of the L-th F/F circuits L-1 to L-M has its output terminal connected with an input terminal of a first one L-1 of the L-th F/F circuits L-1 to L-M to provide a loop arrangement in the M address generation circuit 3. An output signal of the last F/F circuit of an address generation circuit immediately before the M address generation circuit 3 is applied as a clock signal to all the CLK terminals of the L-th F/F circuits L-1 to L-M. Consequently, the address generation circuits 1 to 3 are connected in series with each other. Output signals issued from the L-th F/F circuits L-1 to L-M are directed to the M addresses 0 to (M-1), respectively, and are then issued therefrom.

As a result, it is possible to identify a desired one of addresses corresponding to a desired one of words in the memory by combination of addresses comprising: A pieces of addresses ranging from the A address 0 to the A address (A-1); B pieces of addresses ranging from the B address 0 to the B address (B-1); . . . , ; and, M pieces of addressees ranging from the M address 0 to the M address (M-1), provided that the number of arrays of from the A address array to the M address array is L.

As a result, the large scale FIFO circuit is provided with (A+B+. . .+M) pieces of the F/F circuits, which enables the FIFO circuit to use a plurality of addresses the number of which is (A×B×. . . ×M=N), which correspond to a plurality of words the number of which is N, wherein A, B, . . . , M, and N are positive integers.

Functions and operations of the large scale FIFO circuit of the present invention having the above construction will be described later in detail with reference to the drawings using a concrete embodiment of the present invention.

Now, with reference to FIG. 2, a first embodiment of the large scale FIFO circuit according to the present invention will be described in construction, wherein words in a memory 20 is divided into two sections, one of which sections is in the A address array and the other in the B address array.

Figure 2:
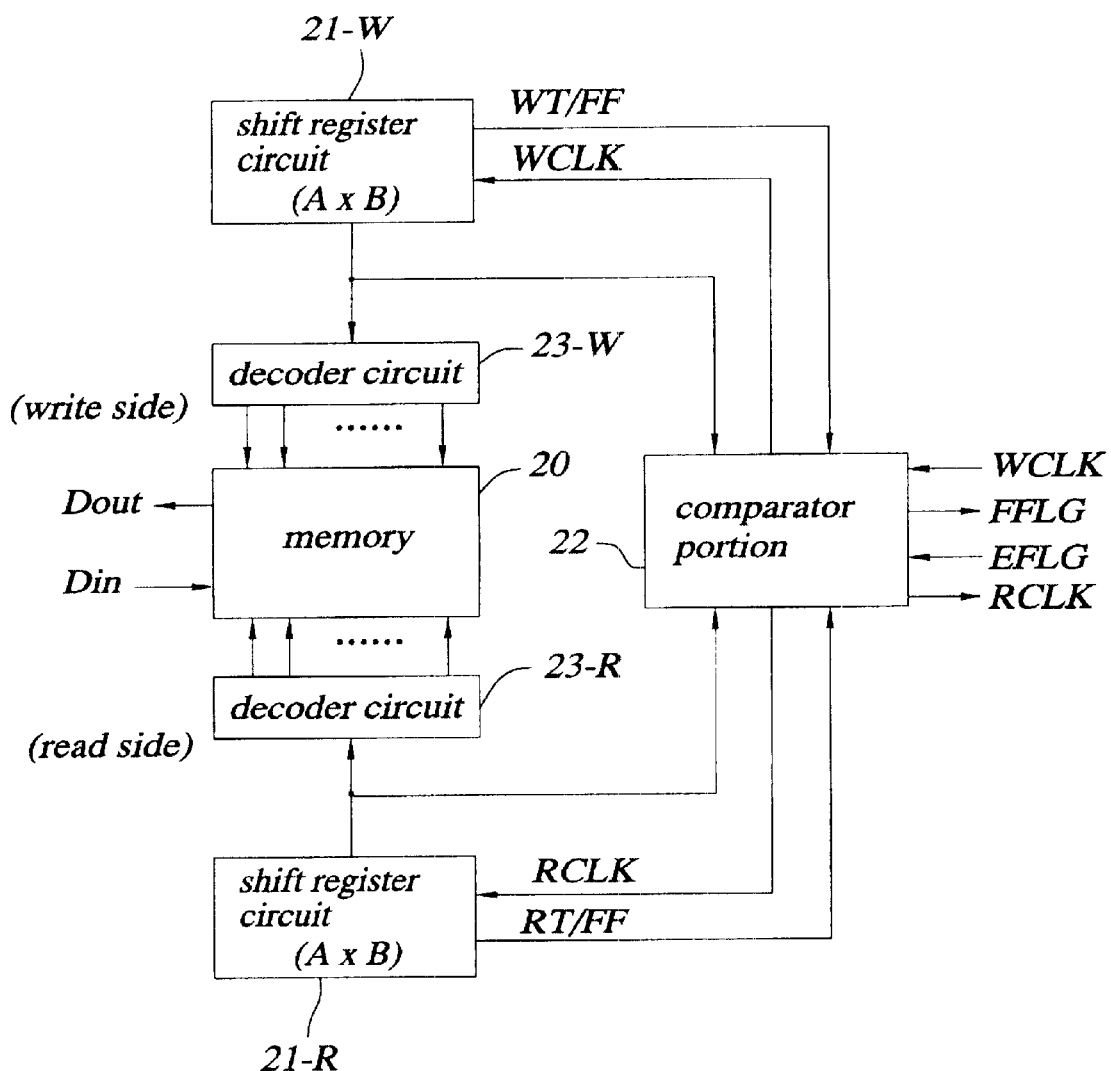
FIG. 2 is a block diagram of an embodiment of the present invention, in which the shift register circuits shown in FIG. 1 are applied to the FIFO circuit.

Shown in FIG. 2 are: a memory 20; shift register circuits 21-W and 21-R; a comparator portion 22; and, decorder circuits 23-W and 23-R.

In the memory 20, input data Din is written to a write address in word. Such write address is identified by the shift register circuit 21-W in the write side of the memory 20. On the other hand, output data Dout is read out of a read address which is identified by the shift register circuit 21-R in the read side of the memory 20.

A difference between the conventional large scale FIFO circuit and the large scale FIFO circuit of this embodiment of the present invention shown in FIG. 2 resides in that: in the large scale FIFO circuit of this embodiment of the present invention shown in FIG. 2, each of the shift register circuit 21-W and 21-R is constructed of a pair of small scale shift register circuits which generate the A and the B addresses, wherein the A addresses are generated by a plurality of the F/F circuits the number of which is A, while the B addresses are generated by a plurality of the F/F circuits the number of which is B, provided that N, A and B are positive integers defined by the following equation in parenthesis: (N=A×B), wherein an address space is defined by N pieces of addresses, wherein the memory 20 is controlled by decoder circuits 23-W and 23-R which correspond to their shift register circuits 21-W and 21-R and are provided in the write and the read side of the memory 20, respectively.

Consequently, though the decoder circuits 23-W and 23-R are newly added to increase the size of the large scale FIFO circuit of the present invention in this respect, the comparator portion 22 of the large scale FIFO circuit of the present invention is considerably reduced in the number of addresses being compared, which makes it possible to reduce the entire size of the large scale FIFO circuit of the present invention.

Figures 3, 4:
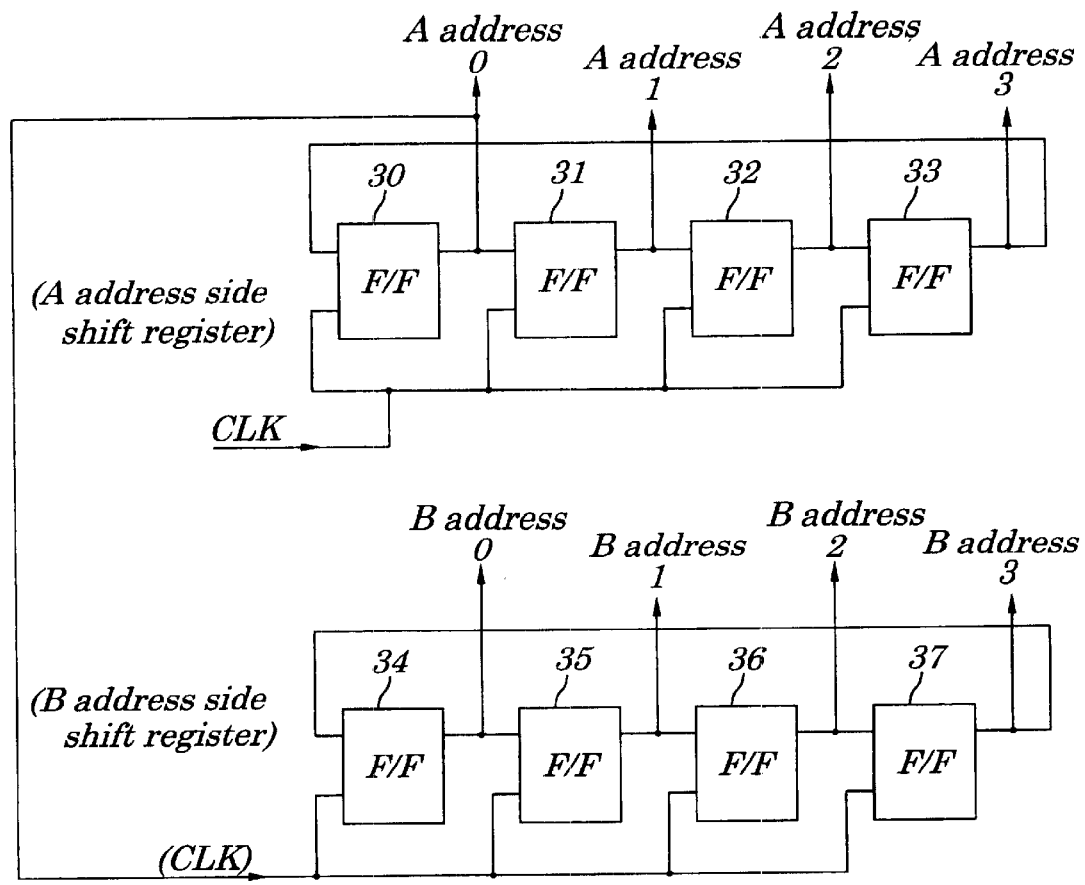
FIG. 3 is a block diagram of an embodiment of the present invention realized with a 16-bit mode.
FIG. 4 is a diagram illustrating the timing of address generation performed in the block diagram shown in FIG. 3.
Figure 5:
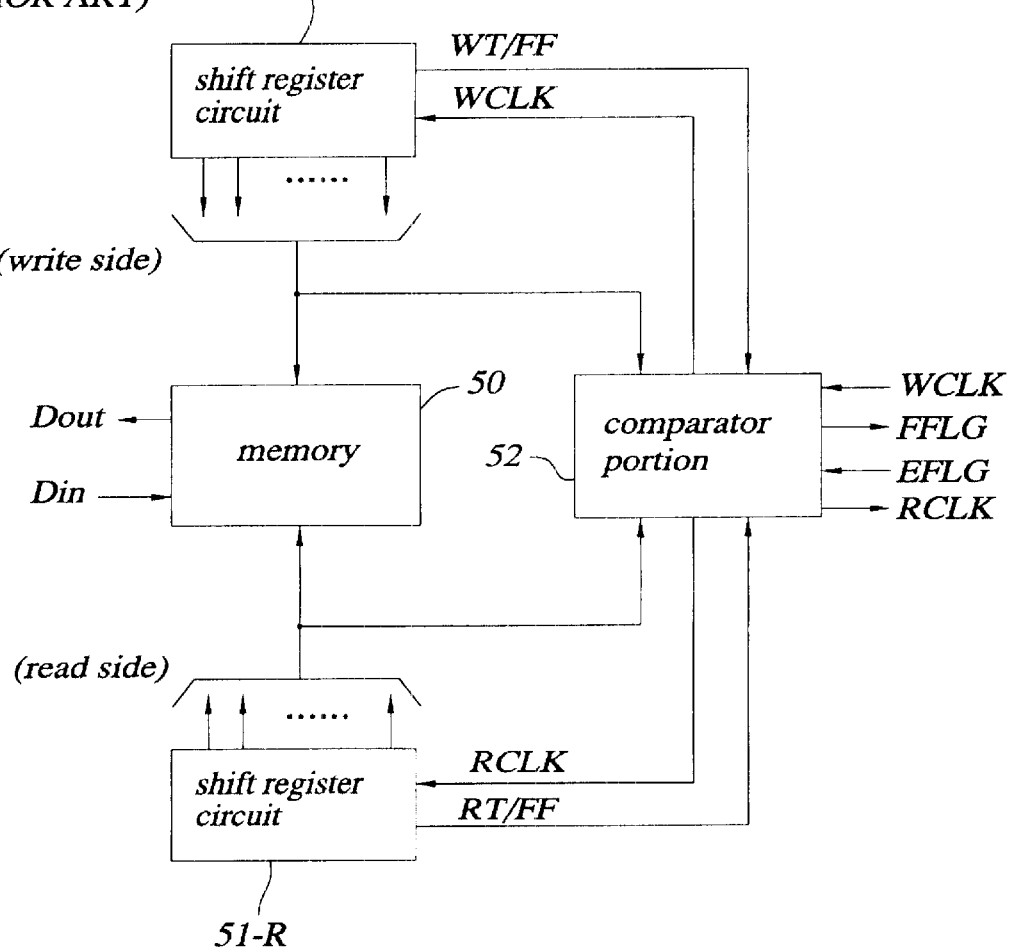
FIG. 5 is a block diagram of an example of a conventional FIFO circuit, illustrating the construction of the FIFO circuit.
Figure 6:
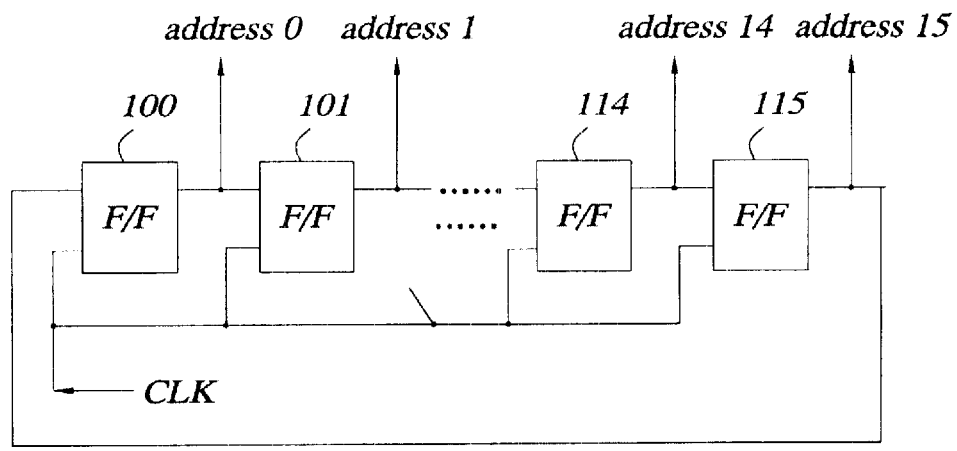
FIG. 6 is a functional block diagram of an example of a conventional shift register circuit.

Next, with reference to FIGS. 3 and 4 showing diagrams concerning a second embodiment of the large scale FIFO circuit of the present invention, a 16-bit mode read side shift register circuit used therein will be described, provided that N=16 which is the number of bits. In the diagrams shown in FIGS. 3 and 4, the positive integers A, B and N are defined by the following equation in parenthesis:

(A=B=4).

As shown in FIG. 3, with respect to 16 bits, the shift register circuit is composed of 8 pieces of F/F circuits 30 to 37. This shift register circuit is divided into a pair of small scale register circuits, one of which is constructed of four pieces of the A address side shift register F/F circuits 30 to 33, and the other of which small scale register circuits is constructed of four pieces of the B address side shift register F/F circuits 34 to 37.

The A address side shift register F/F circuits 30 to 33 have their input and output terminals connected in series with each other, wherein a last one 33 of the F/F circuits 30 to 33 has its output terminal connected with an input terminal of a first one 30 of the F/F circuits 30 to 33 to provide a loop arrangement in the A address side shift register F/F circuits 30 to 33. An external input CLK (i.e., clock) signal is simultaneously inputted to all the CLK terminals of the F/F circuits 30 to 33. Outputs signals from these F/F circuits 30 to 33 are issued as address signals of the A addresses 0 to 3, respectively. Consequently, the shift data circulates through the F/F circuits 30 to 33 as long as the CLK signal is inputted to the CLK terminals of the F/F circuits 30 to 33.

The B address side shift register F/F circuits 34 to 37 have their input and output terminals connected in series with each other, wherein a last one of the F/F circuits 34 to 37 has, its output terminal connected with an input terminal of a first one 34 of the F/F circuits 34 to 37 to provide a loop arrangement in the B address side shift register F/F circuits 34 to 37. Inputted to all the CLK terminals of the F/F circuits 34 to 37 is the output signal issued from the first one 30 of the A address side shift register F/F circuits 30 to 33, wherein the output signal issued from the first one 30, i.e., an address signal of the A address 0 serves as a clock signal, so that the B address side shift register F/F circuits 34 to 37 are connected with the A address side shift register F/F circuits 30 to 33 by cascading these circuits. On the other hand, output signals from issued from the F/F circuits 34 to 37 serves as address signals of the B addresses 0 to 3. Consequently, the shift data is shifted by the output signal issued from the A address side shift register F/F circuit 30 to circulate through the F/F circuits 34 to 37, wherein the output signal issued from the A address side shift register F/F, circuit 30 is inputted to all the CLK terminals of the B address side shift register F/F circuits 34 to 37.

As shown in FIG. 4, in the A address side shift register circuit, for example, in a condition in which the shift data stays in the A address 0 when a first read clock (RCLK) signal is inputted to all the CLK terminals of the F/F circuits 30 to 33, when a second read clock (RCLK) signal is inputted to all the CLK terminals of the F/F circuits 30 to 33, the shift data, is shifted to the A address 1 which is subsequent to the A address 0. After that, when a third RCLK signal is inputted to all the CLK terminals of the F/F circuits 30 to 33, the shift data is further shifted to the A address 2 which is subsequent to the A address 1. In the same way, when a fourth RCLK signal is inputted to all the CLK terminals of the F/F circuits 30 to 33, the shift data is further shifted to the A address 3 which is subsequent to the A address 2. As described above, each time the RCLK signal is inputted to the A address side shift register circuit, the A address off the shift data is shifted step by step. Consequently, four pieces of the successive RCLK signals cause the shift data to circulate or to make one turn through the F/F circuits 30 to 33.

On the other hand, in the B address side shift register circuit, for example, in a condition in which the shift data stays in the B address 0 when a first output signal or pulse (i.e., output signal of the A address 0) from the A address side shift register F/F circuit 30 is inputted to all the CLK terminals of the F/F circuits 34 to 37, a fourth RCLK signal circulating through the A address side shift register F/F circuits 30 to 33 permits the B address side shift register F/F circuits 34 to 37 to receive a next output pulse issued from the A address side shift register F/F circuits 30.

Consequently, at this time, the shift data is shifted up to the B address 1. Then, in the same way as that described in the above, a fourth output pulse issued from the A address side shift register F/F circuits 30 permits the shift data to circulate or makes one turn through the F/F circuits 34 to 38.

Therefore, in the case of 16 pieces of read addresses, first four pieces of the RCLK signals permit the shift data in the A address 0 to shift from the A address 0 to the A address 3 with respect to the B address 0. More specifically, with respect to each of the B addresses 1 to 3, the shift data circulates through the A addresses 0 to 3, so that addressing or address setting is accomplished by combination of the A addresses and the B addresses, wherein the shift data circulates through the A addresses 0 to 3 four times in total.

In the prior art, heretofore, 16 pieces of the F/F circuits have been required. In contrast with this, in the large scale FIFO circuit of the present invention, only four pieces of F/F circuits in each of the A and the B address side are required, wherein a pair of the small scale shift register circuits are constructed of 8 pieces of the F/F circuits in total, wherein the number of the above 8 pieces is a half of the number of the F/F circuits heretofore required in the prior art, i.e., in the conventional large scale FIFO circuit. In this embodiment of the large scale FIFO circuit of the present invention, as described with reference to FIG. 2, though the decoder circuits 23-W and 23-R for decoding the A and the B addresses are required in the write and the read side of the memory 20, it is possible to considerably reduce the number of pieces of data being compared in the comparator portion 20 in which the write side addresses and the read side addresses are compared.

In the above description, 16 bits are divided into two sections so that the number of the F/F circuits is reduced to the half of the above number. In the case of 256 bits, a division process used in the case of 16 bits enables the number of the F/F circuits to decrease to 32 pieces, which corresponds to ⅛ of the number of the F/F circuits used in the conventional FIFO circuit. Further, a quarter division process using 4 bits permits the number of 16 pieces of the F/F circuits, which permits the number of the F/F circuits to decrease up to ¹⁄₁₆. In the large scale FIFO circuit of the present invention, the more scale in construction of the large scale FIFO circuit, the more effects are obtained.

As described above, by finding out a minimum number through a division process performed using the same number of bits, it is possible to reduce the entire size of the large scale FIFO circuit. However, in view of increment in decoder portions, it is necessary for the large scale FIFO circuit to determine an optimum dividing number and an optimum number of the F/F circuits.

In the present invention described above, though only each of the write and the read side of the memory has been described, it is also possible to apply the present invention to any other type of FIFO circuits.

As described above, according to the present invention, it is possible to reduce the shift register circuit in occupation area size, and to reduce the entire size of the FIFO circuit.

It is thus apparent that the present invention is not limited to the above embodiments but may be changed and modified without departing from the scope and spirit of the invention.

Finally, the present application claims the priority of Japanese Patent Application No. Hei10-135525 filed on May 18, 1998, which is herein incorporated by reference.

What is claimed is:

1. A large scale FIFO data system comprising:
an addressable data subsystem; and
an addressing subsystem for the data subsystem, the addressing subsystem including:
a plurality of small scale shift registers comprised of series-connected flip flop stages, the shift registers being connected in a chain, each shift register being further comprised of:
an input terminal;
a first output terminal; and
a clock terminal, wherein the clock terminal of the first shift register in the chain is connected to a system clock input terminal, and wherein the clock terminals of the other shift registers in the chain are respectively connected to the first output terminal of the next preceding shift register in the chain,
wherein:
the number N of distinct addresses generated by the addressing subsystem is an arithmetic product of a plurality of factors;
N and the plurality of factors are positive integers;
the number of shift registers is equal to the number of factors; and
each of the shift registers is comprised of a number of stages corresponding respectively to the numerical value of one of the factors.

2. The large scale FIFO data system as defined in claim 1, wherein:
the plurality of factors are A and B;
A and B are positive integers;
the plurality of shift registers comprises first and second separate shift registers;
the number of stages in the first shift register equals A; and
the number of stages in the second shift register equals B.

3. A large scale FIFO data system comprising:
an addressable memory having an input terminal and an output terminal; and
an addressing subsystem that activates a location in the memory, wherein the addressing subsystem is comprised of:
a plurality of shift registers connected in a chain, each shift register being comprised of a plurality of flip flops connected in series, each flip flop including an input terminal, an output terminal and a clock terminal, the output terminals of the flip flops serving as output terminals for the respective shift registers; and wherein:
the output terminal of the first flip flop in the series is connected to an input of the next flip flop in the series;
the output terminal of the last flip flop in the series is connected to the input of the first flip flop in the series;
the clock terminals of all the flip flops in the first shift register in the chain are connected in common to a system clock input terminal; and
the clock terminals of the flip flops of the other shift registers in the chain are connected in common to respective; output terminals of one of the flip flops in the next preceding shift register in the chain,
wherein:
the number N of distinct addresses generated by the addressing subsystem is an arithmetic product of a plurality of factors;
N and the plurality of factors are positive integers;
the number of shift registers is equal to the number of factors; and
each of the shift registers is comprised of a number of stages corresponding respectively to the numerical value of one of the factors.

4. The large scale FIFO data system as defined in claim 3, wherein:
the plurality of factors are A and B;
A and B are positive integers;
the plurality of shift registers comprises first and second separate shift registers;
the number of stages in the first shift register equals A; and
the number of stages in the second shift register equals B.

5. A large scale FIFO data system comprising:
an addressable memory having an input terminal and an output terminal;
a write side addressing subsystem that activates a location in the memory to receive data from the input terminal; and a read side addressing subsystem that activates a location in the memory to deliver data to the output terminal;

each addressing subsystem being comprised of:
a plurality of shift registers connected in a chain, each shift register being comprised of a plurality of flip flops connected in series, each flip flop including an input terminal, an output terminal and a clock terminal, the output terminals of the flip flops serving as output terminals for the respective shift registers; and wherein:
the output terminal of the first flip flop in the series is connected to an input of the next flip flop in the series;
the output terminal of the last flip flop in the series is connected to the input of the first flip flop in the series;
the clock terminals of all the flip flops in the first shift register in the chain are connected in common to a system clock input terminal; and
the clock terminals of the flip flops of the other shift registers in the chain are connected in common to respective output terminals of one of the flip flops in the next preceding shift register in the chain wherein:
the number N of distinct addresses generated by the addressing subsystem is an arithmetic product of a plurality of factors,
N and the plurality of factors are positive integers;
the number of shift registers is equal to the number of factors; and
each of the shift registers is comprised of a number of stages corresponding respectively to the numerical value of one of the factors.

6. The large scale FIFO data system as defined in claim 5, wherein:
the plurality of factors are A and B;
A and B are positive integers;
the plurality of shift registers comprises first and second separate shift registers;
the number of stages in the first shift register equals A; and
the number of stages in the second shit register equals B.

7. A large scale FIFO data system comprising:
an addressable memory having an input terminal and an output terminal;
a write side addressing subsystem that activates a location in the memory to receive data from the input terminal; and
a read side addressing subsystem that activates a location in the memory to deliver data to the output terminal,
each addressing subsystem being comprised of:
a plurality of multi-stage shift registers connected in a chain, each shift register including an input terminal, an output terminal for each stage and a clock terminal; and wherein:
the clock terminal of the first shift register in the chain is connected to a system clock input terminal;
one output terminal of each of the shift registers in the chain is connected to the clock terminal of the next shift register in the chain; an
the output terminals of the shift registers are connected to a decoder circuit that is operative to address the memory wherein:
the number N of distinct addresses generated by the addressing subsystem is an arithmetic product of a plurality of factors,
N and the plurality of factors are positive integers;
the number of shift registers is equal to the number of factors; and
each of the shift registers is comprised of a number of stages corresponding respectively to the numerical value of one of the factors.

8. The large scale FIFO data system as defined in claim 7, wherein:
the plurality of factors are A and B;
A and B are positive integers;
the plurality of shift registers comprises first and second separate shift registers;
the number of stages in the first shift register equals A; and
the number of stages in the second shift register equals B.

9. A large scale FIFO data system comprising:
an addressable memory having an input terminal and an output terminal;
a write side addressing subsystem that activates a location in the memory to receive data from the input terminal; and
a read side addressing subsystem that activates a location in the memory to deliver data to the output terminal,
wherein each addressing subsystem is comprised of:
a plurality of small scale shift registers connected in a chain, each shift register including an input terminal, an output terminal for each stage and a clock terminal;
the clock terminal of the first shift register in the chain is connected a system clock input terminal;
one output terminal of each of the shift registers in the chain is connected to the clock terminal of the next shift register in the chain; and
the output terminals of the shift registers: represent memory addresses wherein:
the number N of distinct addresses generated by each addressing subsystem is an arithmetic product of a plurality of factors,
N and the plurality of factors are positive integers;
the number of shift registers in each addressing subsystem is equal to the number of factors; and
each of the shift registers is comprised of a number of stages corresponding respectively to the numerical value of one of the factors.

10. The large scale FIFO data system as defined in claim 9, wherein:
the plurality of factors are A and B;
A and B are positive integers;
the plurality of shift registers in each addressing subsystem comprises first and second separate shift registers;
the number of stages in the first shift register equals A; and
the number of stages in the second shift register equals B.

11. An addressing method for a large scale FIFO data system including an addressable data subsystem, and an addressing subsystem for the data subsystem, method comprising the steps of:
establishing a number N of distinct addresses to be generated by the addressing subsystem as an arithmetic product of a plurality of factors; wherein N and the factors are positive integers;

providing a plurality of small scale shift registers connected in a chain, each shift register being comprised of a plurality of series-connected flip flop stages, the number of shift registers being equal to the number of factors;

providing each of the shift registers with a number of stages corresponding respectively to the numerical value of one of the factors;

advancing a first shift register in the chain in response to a system clock signal;

advancing the other shift registers in the chain in response to an output signal from the next preceding shift register in the chain; and providing outputs from the shift registers to define the addresses.

12. The addressing method as defined in claim 11, further including the step of providing the outputs of the shift registers to a decoder to address the data subsystem.

13. An addressing method for a large scale FIFO data system including an addressable memory having an input terminal and an output terminal and an addressing subsystem that activates a location in the memory, the method comprising the steps of:

establishing a number N of distinct addresses to be generated by the addressing subsystem as an arithmetic product of a plurality of factors; wherein N and the factors are positive integers;

providing a plurality of shift registers connected in a chain, each shift register being comprised of a plurality of flip flops connected in series, each flip flop including an input terminal, an output terminal and a clock terminal, the output terminals of the flip flops serving as output terminals for the respective shift registers and as inputs for the succeeding flip flop in the series, with the output terminal of the last flip flop in the series being connected to the input terminal of the first flip flop in the series, the number of shift registers being equal to the number of factors;

providing each of the shift registers with a number of flip flops corresponding respectively to the numerical value of one of the factors;

applying a system clock signal to all of the clock terminals of the flip flops of a first shift register in the chain to advance the first shift register;

applying an output signal from the next preceding shift register in the chain to each of the other shift registers in the chain to advance the other shift registers one step for each complete cycle of the flip flops of the next preceding shift register; and providing outputs from the shift registers to define the memory addresses.

14. The addressing method as defined in claim 13, further including the step of providing the outputs of the shift registers to a decoder to address the data subsystem.

15. An addressing method for a large scale FIFO data system including an addressable memory having an input terminal and an output terminal, a write side addressing subsystem that activates a location in the memory to receive data from the input terminal, and a read side addressing subsystem that activates a location in the memory to deliver data to the output terminal, the method comprising the steps of:

establishing a number N of distinct addresses to be generated by each of the addressing subsystem as an arithmetic product of a plurality of factors, N and the factors being positive integers;

providing, for each of the addressing subsystems, a plurality of shift registers connected in a chain, the number of shift registers in each chain being equal to the number of factors;

providing, for each of the shift registers in each chain, a respective number of stages comprised of a series-connected flip flops corresponding to the numerical value of one of the factors;

applying a system clock signal to a clock terminal of all the flip flops of a first shift register in each of the chains to advance the first shift registers;

applying an output signal from the next preceding shift register in each of the chains to each of the other shift registers in the respective chain to advance the other shift registers of the chain one step for each complete cycle of the flip flops of the next preceding shift registers; and providing outputs from the shift registers to define the respective write side and read side memory addresses.

16. The addressing method as defined in claim 15, further including the steps of:

providing the outputs of the shift registers of the write side addressing subsystem to a first decoder to activate a memory position to receive data from the input terminal; and providing the outputs of the shift registers of the read side addressing subsystem to a second decoder to activate a memory position to deliver data to the output terminal.

* * * * *